United States Patent [19]

Zun

[11] Patent Number: 5,351,364
[45] Date of Patent: Oct. 4, 1994

[54] CASTER-SUPPORTING DEVICE FOR A STROLLER

[76] Inventor: Hong-Fu Zun, No. 59, Alley 85, Lane 673, Chung-Cheng Rd., I-Chia Tsun, Jen-Te Hsiang, Tainan Hsien, Taiwan

[21] Appl. No.: 172,481

[22] Filed: Dec. 21, 1993

[51] Int. Cl.⁵ .............................. B60B 33/00
[52] U.S. Cl. ........................... 16/35 R; 16/44
[58] Field of Search ......................... 16/35 R, 44

[56] References Cited

U.S. PATENT DOCUMENTS

| | | | |
|---|---|---|---|
| 4,543,685 | 10/1985 | Kassai | 16/35 R |
| 4,637,093 | 1/1987 | Kassai | 16/35 R |

*Primary Examiner*—Carmine Cuda
*Attorney, Agent, or Firm*—Webb Ziesenheim Bruening Logsdon Orkin & Hanson

[57] ABSTRACT

A caster-supporting device includes a connector which is adapted to be connected to a stroller frame, a caster-mounting member which is mounted rotatably to the connector and which is adapted to carry rotatably a caster, and a locking unit which locks releasably the caster-mounting member on the connector to set a direction of the caster. The connector extends rotatably into a first upright tube of the caster-mounting member and is formed with a retaining notch. The locking unit includes a spring-loaded control piece provided in a second upright tube of the caster-mounting member, and a lever connected pivotally to the second upright tube adjacent to a top end of the latter. The control piece is axially movable in the second upright tube and has a raised cam portion that extends normally out of an open top end of the second upright tube. The lever has a plate portion, an upwardly extending portion with a key projection on a front end of the plate portion, and a bump that is formed at a bottom surface of the plate portion and that abuts against the raised cam portion.

1 Claim, 4 Drawing Sheets

5,351,364

CASTER-SUPPORTING DEVICE FOR A STROLLER

BACKGROUND OF THE INVENTION

1. Field of the Invention

The invention relates to a caster-supporting device for a stroller, more particularly to a caster-supporting device which is simple in construction, which is easy to assemble and use, and which can be selectively operated so as to set the direction of the caster.

2. Description of the Related Art

A stroller is usually provided with a caster-supporting device for mounting a caster onto the stroller frame. Conventional caster-supporting devices, which can be selectively operated so as to set the direction of the caster, are complicated in construction and are inconvenient to operate.

SUMMARY OF THE INVENTION

The objective of the present invention is to provide a caster-supporting device which is simple in construction, which is easy to assemble and use, and which can be selectively operated so as to set the direction of the caster.

Accordingly, the caster-supporting device of the present invention includes a connector which is adapted to be connected to a stroller frame, a caster-mounting member which is mounted rotatably to the connector and which is adapted to carry rotatably a caster, and a locking unit which locks releasably the caster-mounting member on the connector to set the direction of the caster.

The caster-mounting member includes a first upright tube and a second upright tube formed on one side of the first upright tube and parallel to the first upright tube. The second upright tube has an open top end.

The connector includes a tubular member which extends rotatably into the first upright tube and which is formed with a retaining notch.

The locking unit includes: a caster axle which extends transversely through the second upright tube adjacent to a bottom end of the second upright tube, the caster being carried rotatably on a distal end of the caster axle; a spring support piece provided in the second upright tube and formed with a locking hole to permit extension of the caster axle therethrough; a compression spring provided in the second upright tube on top of the spring support piece; a control piece provided in the second upright tube on top of the compression spring and formed with a raised cam portion on a top end and an elliptical guide hole, the raised cam portion being biased by the compression spring to extend out of the open top end of the second upright tube; a pivot pin extending transversely through the second upright tube adjacent to a top end of the second upright tube and passing through the guide hole in the control piece; and a lever with a plate portion, pivot plates formed on two sides of the plate portion and connected pivotally to two ends of the pivot pin, an upwardly extending portion that extends from a front end of the plate portion and that is formed with a key projection, and a bump formed at a bottom surface of the plate portion. The bump abuts against the raised cam portion. The lever is pivotable to a locked position in which the key projection extends into the retaining notch and in which the bump moves past the raised cam portion and the raised cam portion retains releasably the lever in the locked position.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
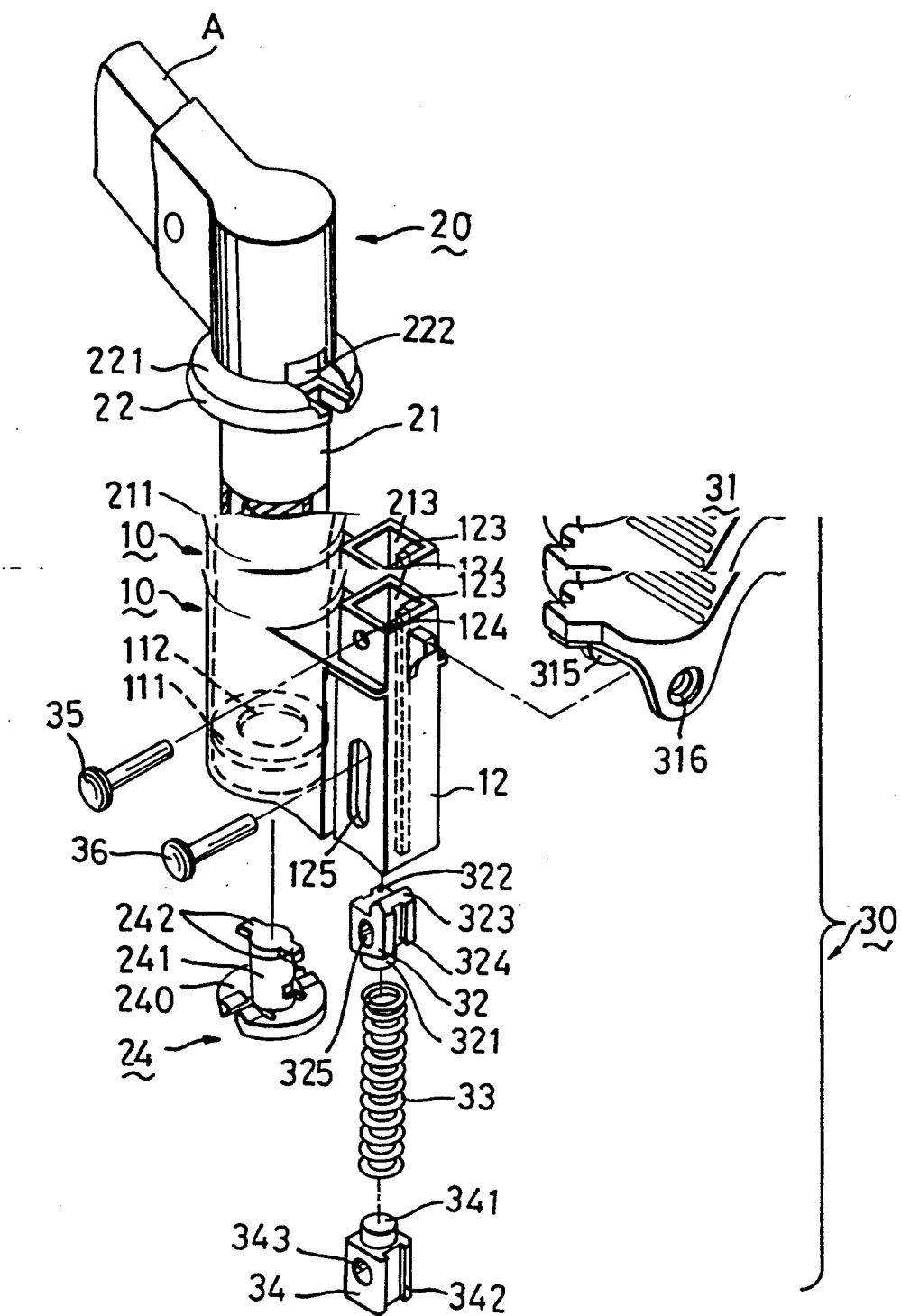
FIG. 1 is an exploded view of the preferred embodiment of a caster-supporting device according to the present invention.
Figure 2:
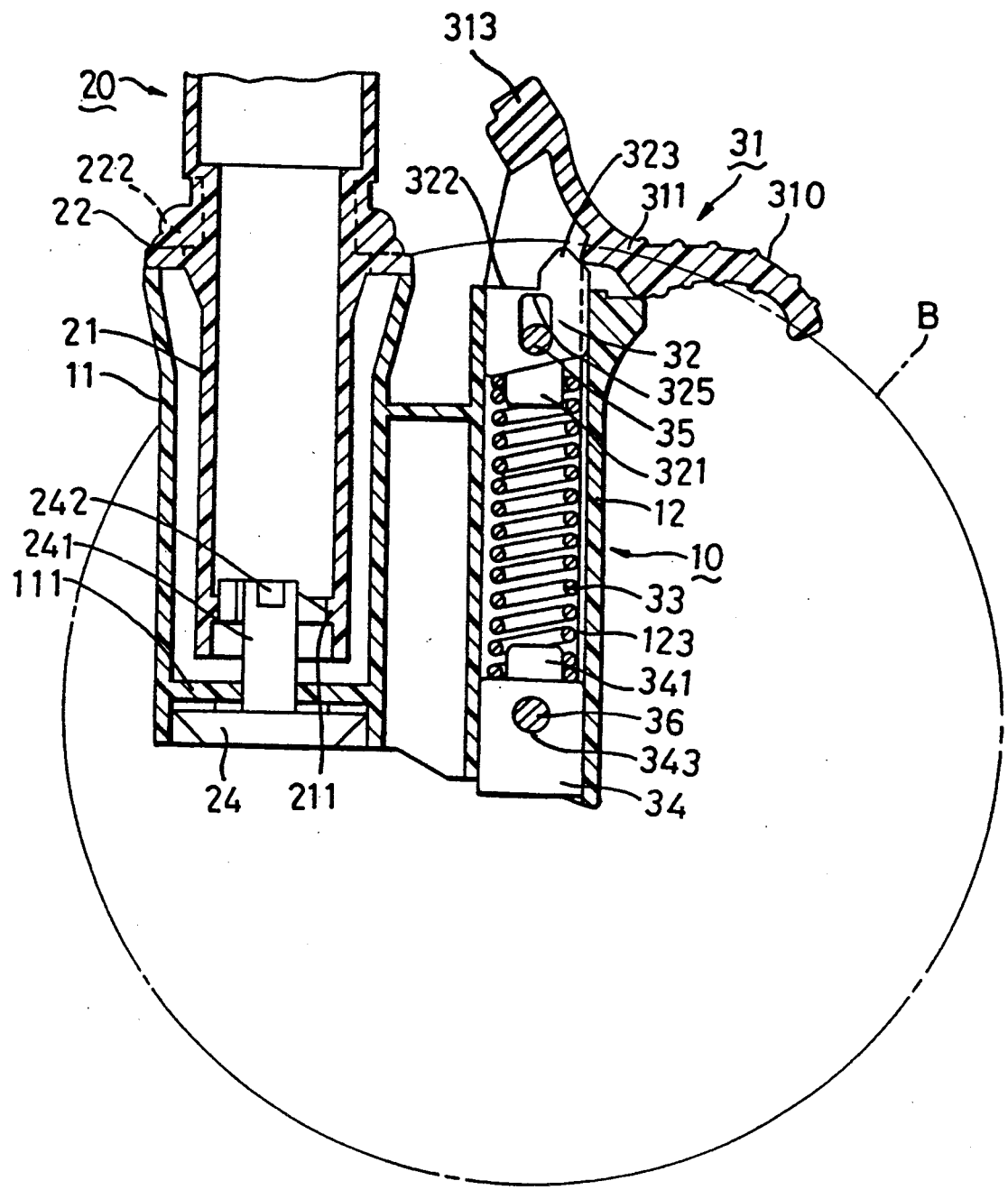
FIG. 2 is a sectional view illustrating the assembly of the preferred embodiment.

Referring to FIGS. 1 and 2, the preferred embodiment of a caster-supporting device according to the present invention is shown to comprise a caster-mounting member 10, a connector 20, and a locking unit 30.

The caster-mounting member 10 is an integrally formed member with a first upright tube 11 to receive the connector 20 therein. The first upright tube 11 is formed with a radial inward flange 111 adjacent to an open bottom end thereof. The flange 111 confines a central opening 112. A second upright tube 12 is formed on one side of the first upright tube 11 and is parallel to the same. The second upright tube 12 has a cross-section which is rectangular in shape and which is smaller than that of the first upright tube 11. The second upright tube 12 has an open top end 122 which is disposed at a level that is lower than the top end of the first upright tube 11. The second upright tube 12 further has an internal wall surface which is formed with an axially extending rib 123. The rib 123 is located opposite to the first upright tube 11 and extends from the open top end 122 to the bottom end of the second upright tube 12. The second upright tube 12 is formed with a horizontal pivot hole 124 adjacent to the top end thereof, and two opposite axially extending slots 125 adjacent to the bottom end thereof.

The connector 20 includes a tubular member 21 that extends into the first upright tube 11 of the caster-mounting member 10. The tubular member 21 has an intermediate portion which is formed with a radial outward projection 22. An annular slide face 221 connects smoothly the outer surface of the tubular member 21 and the surface of the outward projection 22. The slide face 221 is formed with a retaining notch 222. The bottom rod (A) of the stroller frame extends into and is secured to the connector 20. A retaining member 24 mounts rotatably the caster-mounting member 10 onto the connector 20. The retaining member 24 includes a circular base plate 240, an axial stub 241 which projects upwardly from the base plate 240, and a pair of diametrically opposite projections 242 formed on a top end of the stub 241. A radial inward flange 211 is formed in the tubular member 21 adjacent to the bottom end of the latter. The radial inward flange 211 confines a central opening 212 that permits the passage of the projections 242 into the tubular member 21. The radial inward flange 211 is further formed with oppositely disposed retaining grooves 213.

The locking unit 30 includes a lever 31, a control piece 32, a spring 33, a spring support piece 34, a pivot pin 35 and a caster axle 36.

The lever 31 has a plate portion 310 which is formed with a bump 311 at a bottom surface thereof, as shown in FIG. 2. The lever 31 further has an upwardly extending portion 312 that extends from a front end of the plate portion 310, and a rectangular key projection 313 that extends frontwardly from the upwardly extending portion 312. Pivot plates 314, 315 extend downwardly and respectively from two sides of the plate portion 310. The pivot plates 314, 315 are formed with aligned pivot holes 316 that are to be aligned with the pivot hole 124 in the second upright tube 12.

The control piece 32 is a stub which has a bottom portion that is formed with an axial spring guide 321, and a top portion that is formed with a flat face 322 and a raised cam portion 323 on one side of the flat face 322. The control piece 32 is formed with an axially extending keyway 324 that extends from the periphery of the raised cam portion 323 to the bottom portion of the control piece 32. The keyway 324 corresponds with the rib 123 in the second upright tube 12. The control piece 32 is further formed with an elliptical guide hole 325 that is transverse to the keyway 324.

The spring support piece 34 is a stub which has a top portion that is formed with an axial spring guide 341. The spring support piece 34 is formed with an axially extending keyway 342 that extends from the top portion to the bottom portion thereof. The keyway 342 similarly corresponds with the rib 123 in the second upright tube 12. The spring support piece 34 is further formed with a locking hole 343 that is transverse to the keyway 342.

Assembly of the preferred embodiment is as follows: Referring again to FIGS. 1 and 2, the tubular member 21 of the connector 20 is initially inserted into the first upright tube 11 of the caster-mounting member 10. The top edge of the first upright tube 11 abuts against the bottom surface of the outward projection 22. The bottom end of the tubular member 21 is spaced from and is located above the radial inward flange 111 of the first upright tube 11 at this stage. The axial stub 241 of the retaining member 24 is then inserted into the first upright tube 11 so as to extend through the central openings 112, 212 of the radial inward flanges 111, 211. The base plate 240 of the retaining member 24 is then rotated by a 90° angle so as to permit the projections 242 to extend into the retaining grooves 213. This illustrates how the caster-mounting member 10 is mounted rotatably onto the connector 20. The bottom rod (A) of the stroller frame is then inserted into and secured to the connector 20. The locking unit 30 is then secured in the caster-mounting member 10.

To secure the locking unit 30 in the caster-mounting member 10, the spring support piece 34 is initially inserted into the second upright tube 12 such that the rib 123 in the second upright tube 12 extends into the keyway 342 of the spring support piece 32. The caster axle 36, which is longer than the pivot pin 35, extends through the locking hole 343 in the spring support piece 32 and the axially extending slots 125 in the second upright tube 12. The distal end of the caster axle 36 carries rotatably a caster (B) thereon. The spring 33 is then inserted into the second upright tube 12 and has a bottom end which abuts against the top surface of the spring support piece 34 and which surrounds the spring guide 341 of the latter. The control piece 32 is then inserted into the second upright tube 12 such that a top end of the spring 33 abuts against the bottom surface of the control piece 32 and surrounds the spring guide 321 of the latter. The rib 123 in the second upright tube 12 similarly extends into the keyway 324 of the control piece 32. The raised cam portion 323 of the control piece 32 projects out of the second upright tube 12 via the open top end 122, while the elliptical guide hole 325 in the control piece 32 is aligned with the pivot hole 124 in the second upright tube 12 at this stage.

Figure 3:
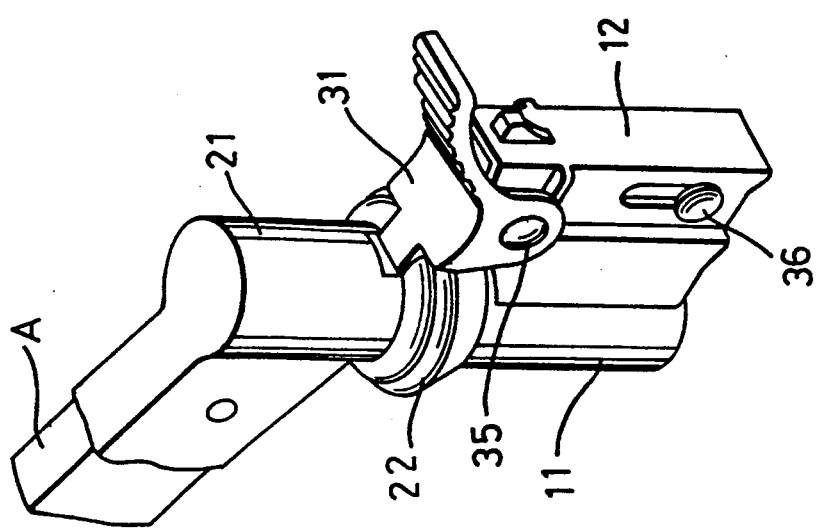
FIG. 3 is a perspective view of the preferred embodiment.

Finally, the lever 31 is installed on the caster-mounting member 10 such that the key projection 313 on the upwardly extending portion 312 of the lever 31 is adjacent to the connector 20 and such that the bump 311 on the plate portion 310 of the lever 31 presses against the raised cam portion 323 of the control piece 32. The pivot holes 316 formed in the pivot plates 314, 315 of the lever 31 are then aligned with the pivot hole 124 in the second upright tube 12. The pivot pin 35 extends through the pivot holes 316, 124 and through the elliptical guide hole 325 of the control piece 32, thereby mounting pivotally the lever 31 on the second upright tube 12. A perspective view which illustrates the assembly of the caster-supporting device of the present invention is shown in FIG. 3.

The following is a brief description of the operation of the preferred embodiment: Referring to FIG. 2, the caster-mounting member 10 rotates freely relative to the connector 20 when the key projection 313 does not extend into the retaining notch 222 on the slide face 221. Since the caster axle 36 carries rotatably the caster (B) thereon, and since the bottom rod (A) of the stroller frame is secured to the connector 20, the caster (B) rotates freely relative to the bottom rod (A) of the stroller frame.

Figure 4:
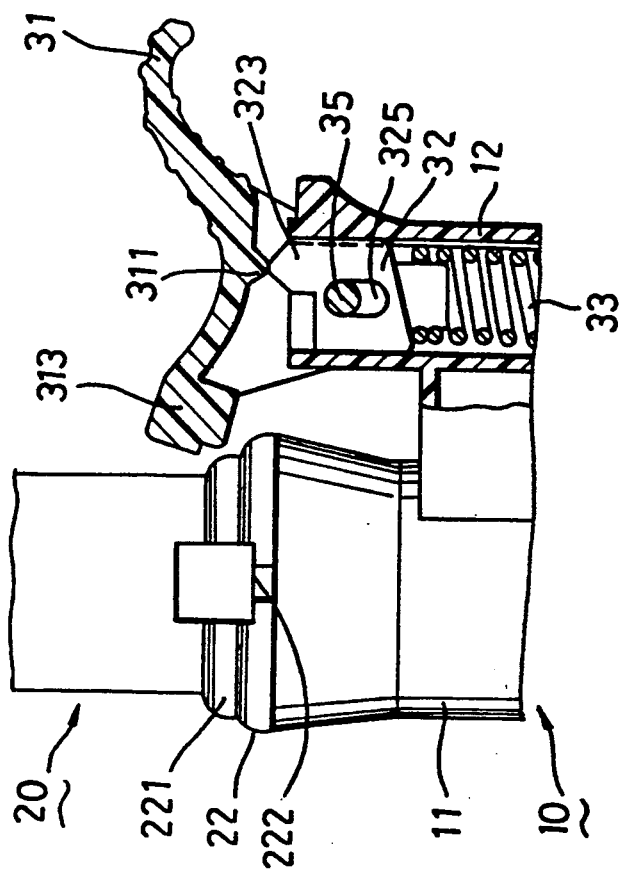
FIG. 4 illustrates how the preferred embodiment is operated so as to be disposed in a direction setting state.
Figure 5:
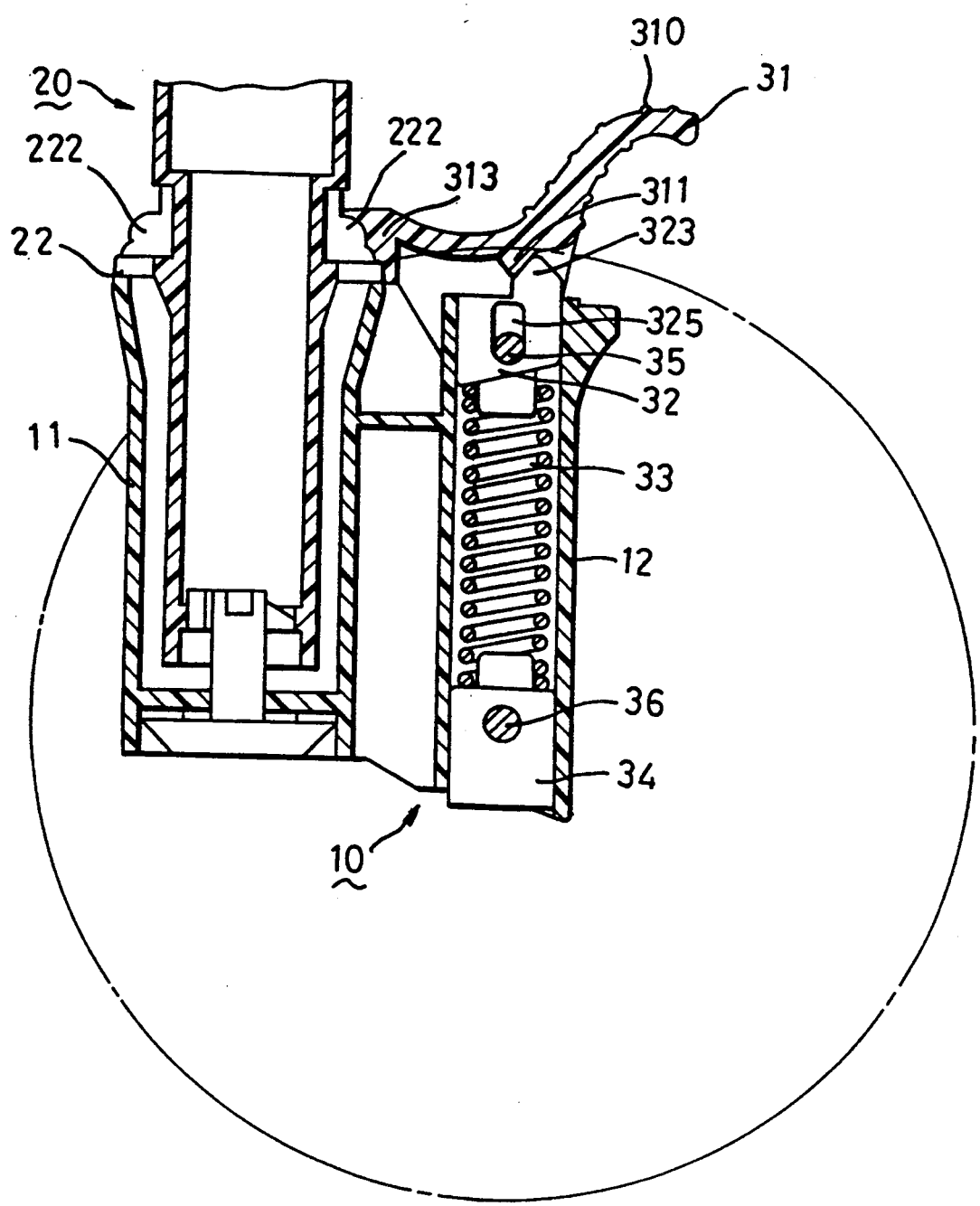
FIG. 5 illustrates the preferred embodiment when in the direction setting state.

Referring to FIG. 4, when it is desired to place the preferred embodiment in a direction setting state, the lever 31 is operated so as to pivot about the pivot pin 35 to a locked position in a direction toward the connector 20. The bump 311 pushes the raised cam portion 323 of the control piece 32 into the second upright tube 12 against action of the spring 33, thereby causing the pivot pin 35 to be disposed in the upper portion of the elliptical guide hole 325. The key projection 313 abuts against the slide face 221 on the outward projection 22 at this stage. The caster-mounting member 10 is rotated relative to the connector 20 until the key projection 313 becomes aligned with the retaining notch 222 in the slide face 221, thereby permitting the former to extend into the latter, as shown in FIG. 5. The bump 311 on the plate portion 310 of the lever 31 moves past the raised cam portion 323 of the control piece 32, thereby permitting the spring 33 to expand and bias the control piece 32 upwardly so that the pivot pin 35 is disposed in the lower portion of the elliptical guide hole 325. The raised cam portion 323 of the control piece 32 retains the lever 31 in the locked position at this stage, thereby preventing free rotation of the caster (B) relative to the bottom rod (A) of the stroller frame.

When it is desired to release the preferred embodiment from the direction setting state, the plate portion 310 of the lever 31 is pressed so as to cause the lever 31 to pivot about the pivot pin 35 in a direction away from the connector 20. The key projection 313 disengages from the retaining notch 222, and the preferred embodiment reverts to the normal operating state, as shown in FIG. 2.

It has thus been shown that the caster-supporting device is simple in construction and is easy to assemble and use. The direction of the caster (B) can be set by operating the lever 31 and by rotating the caster-mounting member 10 relative to the connector 20 in order to permit the key projection 313 to engage the retaining notch 222 in the connector 20. The objective of the present invention is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A caster-supporting device for a stroller, including a connector which is adapted to be connected to a stroller frame, a caster-mounting member which is mounted rotatably to said connector and which is adapted to carry rotatably a caster, and a locking unit which locks releasably said caster-mounting member on said connector to set a direction of the caster, wherein:

said caster-mounting member includes a first upright tube and a second upright tube formed on one side of said first upright tube and parallel to said first upright tube, said second upright tube having an open top end;

said connector includes a tubular member which extends rotatably into said first upright tube and which is formed with a retaining notch; and said locking unit includes: a caster axle which extends transversely through said second upright tube adjacent to a bottom end of said second upright tube, the caster being carried rotatably on a distal end of said caster axle; a spring support piece provided in said second upright tube and formed with a locking hole to permit extension of said caster axle therethrough; a compression spring provided in said second upright tube on top of said spring support piece; a control piece provided in said second upright tube on top of said compression spring and formed with a raised cam portion on a top end and an elliptical guide hole, said raised cam portion being biased by said compression spring to extend out of said open top end of said second upright tube; a pivot pin extending transversely through said second upright tube adjacent to a top end of said second upright tube and passing through said guide hole in said control piece; and a lever with a plate portion, pivot plates formed on two sides of said plate portion and connected pivotally to two ends of said pivot pin, an upwardly extending portion that extends from a front end of said plate portion and that is formed with a key projection, and a bump formed at a bottom surface of said plate portion, said bump abutting against said raised cam portion, said lever being pivotable to a locked position in which said key projection extends into said retaining notch and in which said bump moves past said raised cam portion and said raised cam portion retains releasably said lever in the locked position.

* * * * *